(12) United States Patent
Kim

(10) Patent No.: US 9,756,708 B2
(45) Date of Patent: Sep. 5, 2017

(54) INDOOR LIGHTING DEVICE, INDOOR LIGHTING SYSTEM, AND METHOD OF OPERATING THE SAME

(71) Applicant: LG INNOTEK CO., LTD., Seoul (KR)

(72) Inventor: Dae Hun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/114,633

(22) PCT Filed: Jan. 27, 2015

(86) PCT No.: PCT/KR2015/000849
§ 371 (c)(1),
(2) Date: Jul. 27, 2016

(87) PCT Pub. No.: WO2015/115774
PCT Pub. Date: Aug. 6, 2015

(65) Prior Publication Data
US 2016/0353556 A1    Dec. 1, 2016

(30) Foreign Application Priority Data
Jan. 28, 2014 (KR) ........................ 10-2014-0010944

(51) Int. Cl.
*H05B 37/02* (2006.01)
(52) U.S. Cl.
CPC ..... *H05B 37/0272* (2013.01); *H05B 37/0218* (2013.01); *H05B 37/0227* (2013.01); *Y02B 20/46* (2013.01)

(58) Field of Classification Search
CPC H05B 37/02; H05B 37/0227; H05B 37/0281; H05B 33/0842; H05B 33/0863;
(Continued)

(56) References Cited

U.S. PATENT DOCUMENTS 6,985,069 B2    1/2006  Marmaropoulos
8,044,815 B2    10/2011 Du
(Continued)

FOREIGN PATENT DOCUMENTS

| JP | 2010-517400 A | 5/2010 |
| KR | 10-2005-0006103 A | 1/2005 |
| KR | 10-1332944 B1 | 11/2013 |

*Primary Examiner* — Douglas W Owens
*Assistant Examiner* — Wei Chan
(74) *Attorney, Agent, or Firm* — Birch, Stewart, Kolasch & Birch, LLP

(57) ABSTRACT

Disclosed is an indoor lighting device installed at a first space. The indoor lighting device includes a lighting emiting unit, a storage unit to store information of an operating condition of the light emitting unit according to an operating state of a mobile terminal, a wireless communication unit to make wireless communication with the mobile terminal, and a controller that receives the information of the operating state of the mobile terminal through the wireless communication unit to check the operating condition of the light emitting unit corresponding to the received information of the operating state and to operate the light emitting unit based on the checked operating condition of the light emitting unit.

19 Claims, 8 Drawing Sheets

(58) Field of Classification Search
CPC ............ H05B 33/0869; H05B 37/0209; H05B 37/0218; H05B 37/0245; H05B 37/0254; H05B 37/0272; H05B 37/029; A61M 2021/0044
USPC ........ 315/153, 294, 297, 307, 308, 312, 362
See application file for complete search history.

(56) References Cited

U.S. PATENT DOCUMENTS

| | | | | |
|---|---|---|---|---|
| 2003/0043073 | A1* | 3/2003 | Gray | G01S 5/0215 342/465 |
| 2006/0046709 | A1* | 3/2006 | Krumm | H04N 21/4126 455/422.1 |
| 2006/0076908 | A1* | 4/2006 | Morgan | H05B 33/0842 315/312 |
| 2008/0181172 | A1 | 7/2008 | Angelhag et al. | |
| 2008/0265799 | A1* | 10/2008 | Sibert | H05B 37/0245 315/292 |
| 2009/0278479 | A1* | 11/2009 | Platner | H05B 37/0245 315/312 |
| 2010/0171430 | A1 | 7/2010 | Seydoux | |
| 2011/0282468 | A1 | 11/2011 | Ashdown | |
| 2012/0040606 | A1* | 2/2012 | Verfuerth | H05B 37/0218 455/7 |
| 2013/0003572 | A1* | 1/2013 | Kim | H04W 64/00 370/252 |
| 2013/0093329 | A1 | 4/2013 | Shin | |

* cited by examiner

Fig. 3
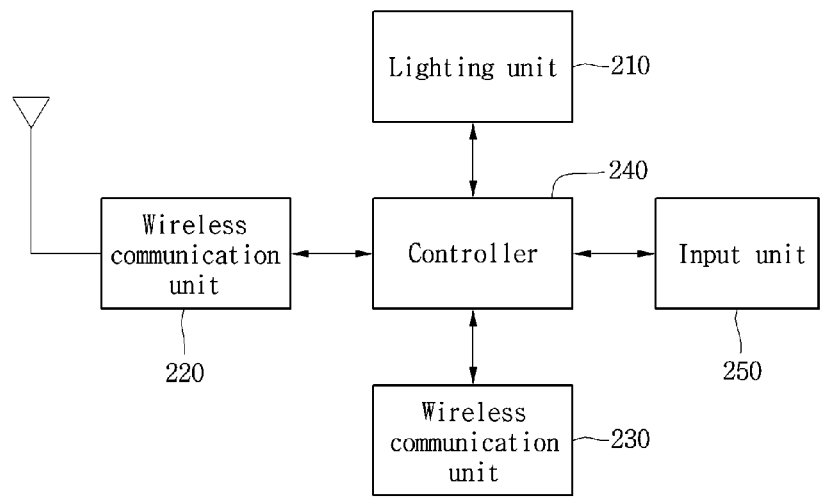
[Fig. 4]
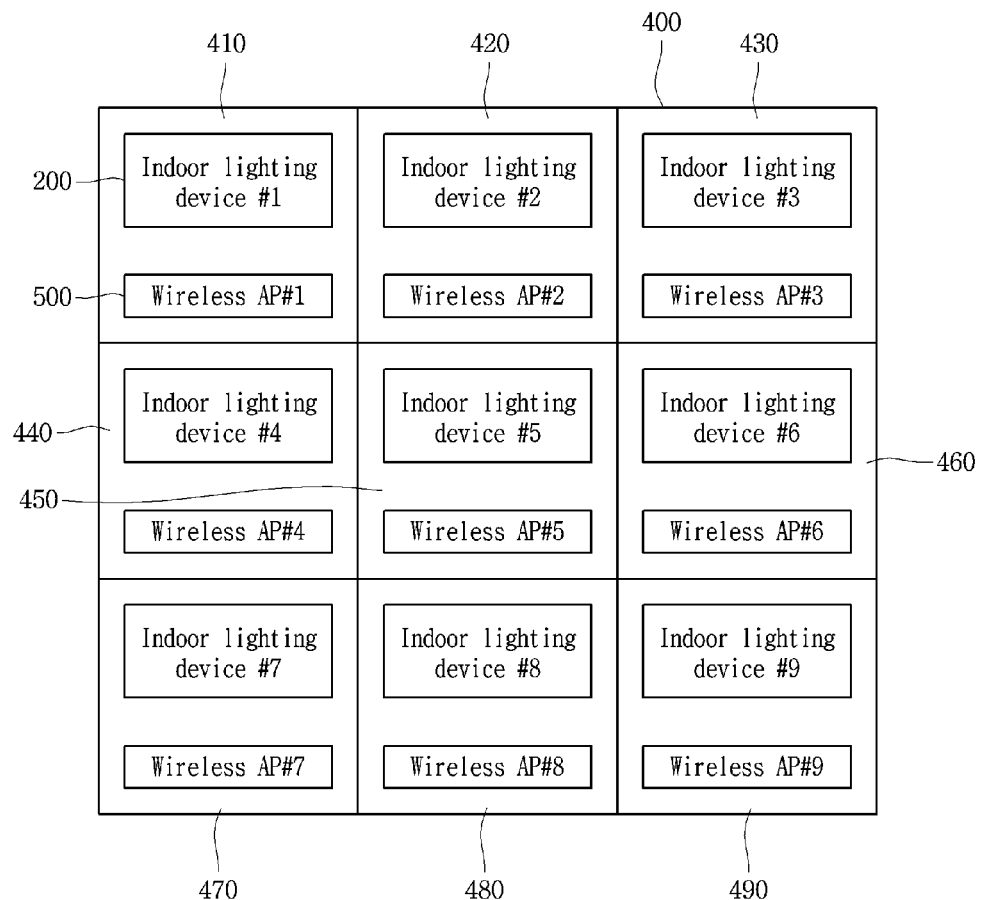

Fig. 5

| Signal intensity | Light emitting unit power | Light emitting level |
|---|---|---|
| ▪▪▪▪ | ON | 100% |
| ▪▪▪▫ | ON | 80% |
| ▪▪▫▫ | ON | 60% |
| ▪▪▫▫▫ | ON | 40% |
| ▪▫▫▫▫ | ON | 20% |
| ▫▫▫▫▫ | OFF | 0% |

Fig. 6

| Type of contents | Light emitting unit power | Light emitting level |
|---|---|---|
| 1st moving picture | ON | 100% |
| 2nd moving picture | ON | 80% |
| 3rd moving picture | ON | 60% |
| 1st still image | ON | 40% |
| 2nd still image | ON | 20% |
| non-use | OFF | 0% |

Fig. 7

| illuminance level | Light emitting unit power | Light emitting level |
|---|---|---|
| 1st level | ON | 100% |
| 2nd level | ON | 80% |
| 3th level | ON | 60% |
| 4th level | ON | 40% |
| 5th level | ON | 20% |
| 6th level | OFF | 0% |

Fig. 8

| Brightness of screen of terminal | Light emitting unit power | Light emitting level |
|---|---|---|
| 5th level | ON | 100% |
| 4th level | ON | 80% |
| 3th level | ON | 60% |
| 2nd level | ON | 40% |
| 1st level | ON | 20% |
| zero level | OFF | 0% |

Fig. 9

| Volume level | Light emitting unit power | Light emitting level |
|---|---|---|
| 5th level | ON | 100% |

Fig. 10

| Download progress state | Light emitting unit power | Light emitting level |
|---|---|---|
| 0% | ON | 100% |
| 20% | ON | 80% |
| 40% | ON | 60% |
| 60% | ON | 40% |
| 80% | ON | 20% |
| Completion | OFF | 0% |

Fig. 11

| Residual amount of battery | Light emitting unit power | Light emitting level |
|---|---|---|
| 100% | ON | 100% |
| 80% | ON | 80% |
| 60% | ON | 60% |
| 40% | ON | 40% |
| 20% | ON | 20% |
| discharge(power off) | OFF | 0% |

INDOOR LIGHTING DEVICE, INDOOR LIGHTING SYSTEM, AND METHOD OF OPERATING THE SAME

CROSS REFERENCE TO RELATED APPLICATIONS

This application is the National Phase of PCT/KR2015/000849 filed on Jan. 27, 2015, which claims priority under 35 U.S.C. §119(a) to Korean Patent Application No. 10-2014-0010944 filed on Jan. 28, 2014, all of which are hereby expressly incorporated by reference into the present application.

TECHNICAL FIELD

The present invention relates to an indoor lighting device, an indoor lighting system, and a method of operating the same.

BACKGROUND ART

Recently, as eco-friendly and lower power lighting has been spotlighted, and it is no exaggeration to say that the core technology thereof is a light emitting diode lighting (LED) technology. In addition, LED lighting devices have been actively spread. Recently, lighting devices have functions that a user can adjust the brightness of the lighting devices to desirable brightness beyond a simple turn-on/off function.

In addition, the burden of electricity rates is increased due to the high price of oil, and safety is issued in nuclear power generation. Accordingly, the change of a current energy consumption structure is required. Lighting occupies 20% of global power consumption. If the LED is used for the lighting, energy can be saved by 30% to 50% in the field of the lighting.

In addition, if a smart lighting system is constructed by grafting information technologies (sensors, communication, micro-processors, and the like) to the LED, energy reduction (by about 50% to about 90%) is innovatively accomplished and human-friendly and optimal lighting environments can be realized.

However, according to the related art, smart lighting systems are only limited to energy reduction and emotional lighting, and the optimal lighting technologies based on user actions are not realized.

DISCLOSURE OF INVENTION

Technical Problem

The embodiment of the present invention provides an indoor lighting device, which operates based on the state of a mobile terminal in use by a user, an indoor lighting system, and a method of operating the same.

Meanwhile, the technical objects accomplished by the embodiments may not be limited to the above object, and other technical objects of the embodiment will be clearly understood by those skilled in the art from the following description.

Solution to Problem

According to the embodiment, there is provided an indoor lighting device installed at a first space. The indoor lighting device includes a lighting emitting unit, a storage unit to store information of an operating condition of the light emitting unit according to an operating state of a mobile terminal, a wireless communication unit to make wireless communication with the mobile terminal; and a controller that determines if the mobile terminal is located at the first space, and decides an operating condition of the light emitting unit according to the operating state of the mobile terminal using information stored in the storage unit if the mobile terminal is located at the first space.

According to the embodiment, there is provided a lighting system including a mobile terminal, and a plurality of indoor lighting devices installed at a space divided into a plurality of regions, respectively. Each indoor lighting device includes a lighting emitting unit, a storage unit to store information of an operating condition of the light emitting unit according to an operating state of the mobile terminal, a wireless communication unit to make wireless communication with the mobile terminal, and a controller that determines if the mobile terminal is located at a first space where the controller is installed, and decides an operating condition of the light emitting unit according to the operating state of the mobile terminal using information stored in the storage unit if the mobile terminal is located at the first space.

According to the embodiment, there is provided a method of operating an indoor lighting device installed at a first space. The method includes determining if a mobile terminal is located at the first space where the indoor lighting device is installed, receiving information of an operating state of the mobile terminal if the mobile terminal is determined as being located at the first space, and deciding an operating condition of a light emitting unit based on the received information of the operating state.

Advantageous Effects of Invention

According to the embodiment of the present invention, indoor lighting can be realized based on sense states of various sensors, such as an illuminance sensor, a proximity sensor, and a camera, embedded in the mobile terminal, so that the number of components provided in the indoor lighting device. Accordingly, the component cost can be reduced, and the volume of the indoor lighting device can be reduced.

In addition, according to the embodiment of the present invention, the indoor lighting device is operated according to the operating states of the mobile terminal in use by the user, thereby providing the lighting environment appropriate to the demand of the user or the living environment of the user and actively and ideally operated according to occasions.

BRIEF DESCRIPTION OF DRAWINGS

FIG. 3 is a detailed block diagram showing an indoor lighting device 200 shown in FIG. 1.

FIG. 4 is a block diagram showing an installation example of the lighting system according to the embodiment of the present invention.

FIG. 5 is a view showing a first conditional table according to the embodiment of the present invention.

FIG. 6 is a view showing a second conditional table according to the embodiment of the present invention.

FIG. 7 is a view showing a third conditional table according to the embodiment of the present invention.

FIG. 8 is a view showing a fourth conditional table according to the embodiment of the present invention.

FIG. 9 is a view showing a fifth conditional table according to the embodiment of the present invention.

FIG. 10 is a view showing a sixth conditional table according to the embodiment of the present invention.

FIG. 11 is a view showing a seventh conditional table according to the embodiment of the present invention.

MODE FOR THE INVENTION

Figure 1:
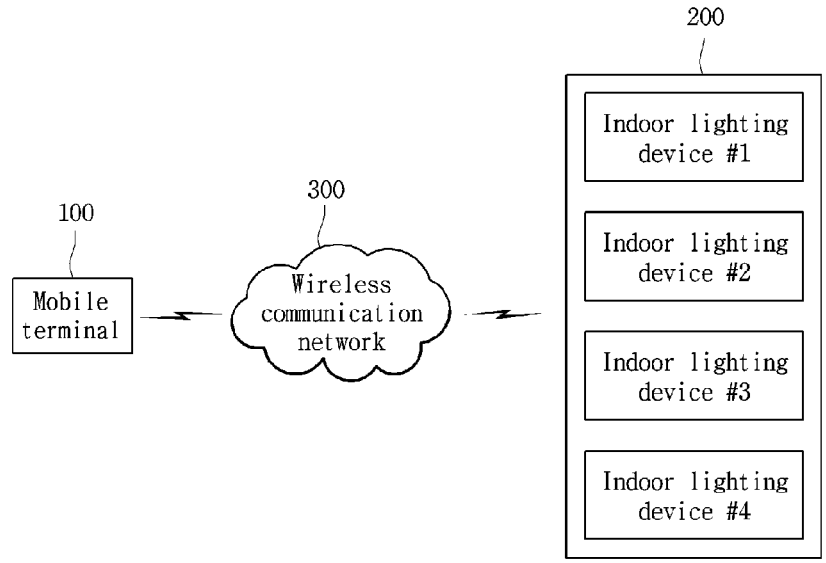
FIG. 1 is a schematic block diagram showing the concept of a lighting system according to the embodiment of the present invention.

The advantages, the features, and schemes of achieving the advantages and features of the disclosure will be apparently comprehended by those skilled in the art based on the embodiments, which are detailed later in detail, together with accompanying drawings. However, the present invention is not limited the embodiments disclosed below, but can be realized in various forms. The present embodiments are provided to make the disclosure perfect and to make those skilled in the art completely understand the technical field of the present invention. The present invention is defined only accompanying claims. Throughout the specification, the same reference number will be assigned to the same elements.

In the following description of the embodiments of the present invention, if it is determined that description about well known functions or configurations may make the subject matter of the embodiments unclear, the details thereof will be omitted. Terminologies used in this specification are selected from general terminologies by taking the functions thereof into consideration and they may vary depending on the intentions of operators having ordinary skill in the art, customers and appearance of new technologies. In specific cases, the terminologies may be arbitrarily selected by applicant. In this case, the meaning of the terminologies will be described in corresponding parts of the specification. Accordingly, the terminologies used in this specification should be defined based on the substantial meanings thereof and the whole context throughout the present specification.

The combinations of each block and each step of flowcharts in accompanying drawings may be executed by computer program instructions. Since the computer program instructions are mounted in processors of a general computer, a special computer, and other programmable data processing devices, the instructions executed through the computer or the other programmable data processing devices create units to perform functions described in each block or each step of the flowcharts in the drawings. Since the computer program instructions may be stored in a computer usable memory or a computer readable memory to support the computer or the other programmable data processing devices in order to implement the functions through a specific scheme, the computer program instructions stored in a computer usable memory or a computer readable memory can create manufacturing items including the instruction units to perform functions described in each block or each step of the flowcharts in the drawings. Since computer program instructions can be mounted on the computer, and other programmable data processing devices, a series of operation steps are executed on the computer, and other programmable data processing devices to create processes executed by the computers, so that the instructions to run the computer, and other programmable data processing devices can provide steps to perform the functions in each block and each step of the flowcharts in the drawings.

In addition, each block or each step can represent a portion of a module, a segment, or a code including at least one executable instruction to perform specific logical function (functions). In addition, it should be noted that the described functions in blocks or steps can be provided regardless of a sequence in several alternative embodiments. For example, two blocks or two steps, which are subsequently shown) may be substantially simultaneously performed or may be reversely performed according to relevant functions from time to time.

FIG. 1 is a schematic block diagram showing the concept of a lighting system according to the embodiment of the present invention.

Referring to FIG. 1, a lighting system according to the embodiment of the present invention includes a mobile terminal 100, an indoor lighting device 200, and a wireless communication network 300.

At least one indoor lighting device 200 is installed in an individual indoor space which is previously allocated. For example, the indoor lighting device 200 may include a central lighting device, a cove lighting device, a downlight, and a stand.

The mobile terminal 100 makes communication with the indoor lighting device 200 through the wireless communication network 300 to transmit various information corresponding to the operating state of the mobile terminal 100 to the indoor lighting device 200.

The mobile terminal 100 may include a cellular phone, a smart phone, a laptop computer, a digital broadcasting terminal, a personal digital assistant (PDA), portable multimedia player (PMP), and a navigation. However, those skilled in the art can easily understand that the configuration according to the embodiment disclosed in the present invention is applicable for a stationary terminal, such as a digital television, or a desktop computer except for the application only to the mobile terminal The wireless communication network 300 according to the embodiment of the present invention may include Wi-Fi. Accordingly, a wireless access point (AP) may be installed between the mobile terminal 100 and the indoor lighting device 200.

In this case, the indoor lighting device 200 may include indoor lighting device #1, indoor lighting device #2, indoor lighting device #3, and indoor lighting device #4. In this case, the number of the indoor lighting device 200 may be increased or reduced. One device may be installed in one previously allocated space. Alternately, a plurality of lighting devices may be installed in one space.

The indoor lighting devices 200 may be installed in the state that the indoor lighting devices 200 are spatially separated from each other, and each wireless AP may be installed in a partitioned space.

For example, when the indoor lighting device 200 is installed at home, a space may be partitioned into a living room, a toilet, a main room, a box room, a kitchen, and a utility room.

In addition, when the indoor lighting device 200 is installed in a school, the space may be partitioned into a main office, an office of a principal, a classroom, and a toilet.

In addition, the wireless AP may be installed at a space where each indoor lighting device 200 is installed.

Each indoor lighting device 200 makes communication with the wireless AP installed at the space where the indoor lighting device 200 is installed to check the connection state between the mobile terminal 100 and the wireless AP.

The determination of the connection state between the mobile terminal 100 and the wireless AP is performed to check whether or not the mobile terminal 100 is located at the space where the indoor lighting device 200 is installed. Accordingly, if the mobile terminal 100 is in the connection state with the wireless AP, it is checked that the mobile terminal 100 exists at the space where the indoor lighting device 200 is installed.

Each indoor lighting device 200 decides an operating condition of a lighting part (to be described) according to the operating state information of the mobile terminal 100 if the mobile terminal 100 is the connection state with the wireless AP installed at the space where the indoor lighting device 200 is located.

In this case, the indoor lighting device 200 may make communication with the wireless AP located at the space where the indoor lighting device 200 is installed, and check a preset position of the mobile terminal 100 according to the communication result. Alternately, the indoor lighting device 200 may check the present position of the mobile terminal 100 through the communication with the mobile terminal 100.

To this end, the indoor lighting device 200 makes communication with the mobile terminal 100 to receive information of the communication connection state with the mobile terminal 100.

In addition, the indoor lighting device 200 requests the information of the wireless AP connected with the mobile terminal 100 if the wireless network state of the mobile terminal 100 is a connection state.

Therefore, the indoor lighting device 200 receives the requested information of the wireless AP, and may check the present position of the mobile terminal 100 depending on whether or not the wireless AP related to the received information is a wireless AP located at the space where the indoor lighting device 200 is installed.

Figure 2:
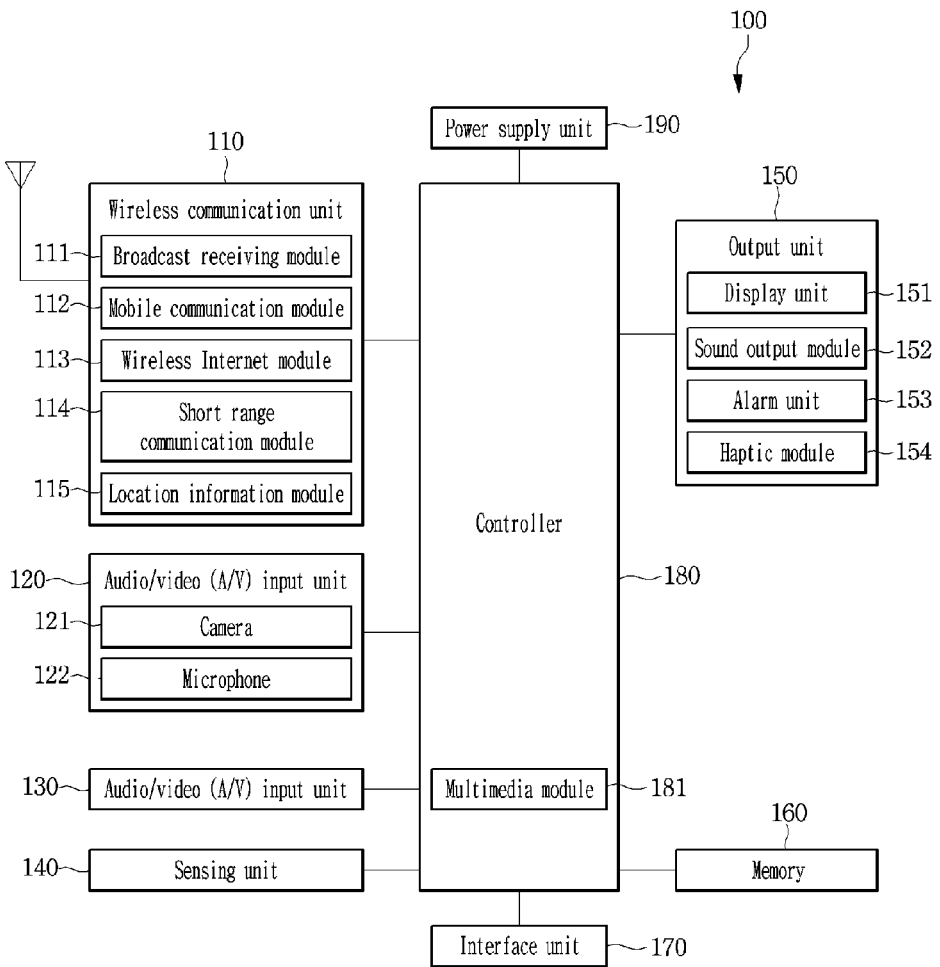
FIG. 2 is a detailed block diagram showing the mobile terminal shown in FIG. 1.

FIG. 2 is a detailed block diagram showing the mobile terminal shown in FIG. 1.

Referring to FIG. 2, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Since components shown in FIG. 2 are not essential components, a mobile terminal having more or fewer components may be realized.

Hereinafter, the components will be sequentially described.

The wireless communication unit 110 may include at least one module allowing wireless communication between the mobile terminal 100 and the wireless communication system or between the mobile terminal 100 and a network in which the mobile terminal 100 is located. For example, the wireless communication unit 110 may include a broadcast receiving module 111, a mobile communication module 112, a wireless Internet module 113, a short range communication module 114, and a location information module 115.

The broadcast receiving module 111 receives information related to a broadcast signal and/or broadcasting from an external broadcast managing server through a broadcast channel.

The broadcast receiving module 111 may receive a digital broadcast signal using a digital broadcast system such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T). In addition, the broadcast receiving module 111 may be configured appropriately to other broadcast systems as well as the above-described digital broadcast system.

The information related to the broadcast signal and/or broadcasting received through the broadcast receiving module 111 may be stored in the memory 160.

The mobile communication module 112 transceives a wireless signal together with at least one of a base station, an external terminal and an external server over a mobile communication network. The wireless signal may include various types of data as a voice call signal, a video call signal, or a text/multimedia message is transceived. [55] The wireless Internet module 113 refers to a module for wireless Internet access, and may be installed inside or outside the mobile terminal 100. Wire Internet technologies may include Wireless LAN (WLAN) Wi-Fi, Wireless broadband (Wibro), World Inter-operability for Microwave Access (Wimax), and High Speed Downlink Packet Access (HSDPA).

The short range communication module 114 refers to a module for short range com-munication. Short range communication technologies may include Bluetooth, Wireless Frequency Identification (RFID), Infrared Data Association (IrDA), Ultra Wideband (UWB), and ZigBee.

The location information module 115 is a module to acquire the location of the mobile terminal, and representatively includes a Global Position System (GPS) system.

Referring to FIG. 2, the A/V input unit 120 is used to input an audio signal or a video signal, and may include a camera 121 and a microphone 122.

The camera 121 processes an image frame such as a still image frame or a moving picture frame acquired by an image sensor at a video call mode or a photographing mode. The processed image frame may be displayed in a display unit 151.

The image frame processed by the camera 121 may be stored in the memory 160 or transmitted to an outside through the wireless communication unit 110. At least two cameras 121 may be provided according to use environments.

The microphone 122 receives an external sound signal by a microphone and processes the external sound in the form of electrical voice data at a call mode, a recording mode, or a voice recognition mode. The processed voice data may be converted in a transmittable form and output to a mobile communication base station through the mobile communication module 112. The microphone 122 may have various noise removing algorithms realized therein to remove noise caused in the process of receiving the external sound signal.

The user input unit 130 generates input data used to control the operation of a user terminal. The user input unit 130 may include a key pad, a dome switch, a touch pad (static pressure/power outage), a jog wheel and a jog switch.

The sensing unit 140 senses the present state of the mobile terminal 100, for example an opening/closing state of the mobile terminal 100, the location of the mobile terminal 100, a user touch state, the orientation of the mobile terminal 100, and the acceleration/deceleration of the mobile terminal 100, to control the operation of the mobile terminal 100. For example, if the mobile terminal 100 is a slide type phone, the sensing unit may sense the opening/closing state of the slide phone. In addition, the sensing unit 140 may sense the power supply state of the power supply unit 190, or the coupling state of the interface unit 170 to an external device. Meanwhile, the sensing unit 140 may include a proximity sensor 141.

The output unit 150 is used to generate visual, auditory, or tactile related outputs, and may include the display unit 151, a sound output module 152, an alarm unit 153, and a haptic module 154.

The display unit 151 displays (outputs) information processed in the mobile terminal 100. For example, when the mobile terminal 100 is at the call mode, the display unit 151 displays a user interface (UI) or a graphic user interface (GUI) related to a call. When the mobile terminal is at the video call mode or the photographing mode, the display unit 151 displays photographed images and/or received images on the UI or the GUI.

The display unit 151 may include at least one of a liquid crystal display (LCD), a thin film transistor-liquid crystal display (TFT), an organic light-emitting diode (OLED), a flexible display, and a 3D display.

When the display unit 151 has a structure mutually layered with a sensor to sense a touch motion (touch sensor) (hereinafter, referred to as "touch screen"), the display unit 151 may be used as an input device in addition to an output device. For example, the touch sensor may have a form of a touch film, a touch sheet, or a touch pad.

The touch sensor may be configured to convert the variation of pressure applied to a specific part of the display unit 151 and the variation of capacitance occurring at the specific part of the display unit. The touch sensor may be configured to detect the pressure in touch as well as the position and the area of a touched part.

If the touch is input with respect to the touch sensor, a signal (signals) corresponding to the touch is sent to a touch controller. The touch controller processes the signal (signals) and transmits corresponding data to the controller 180. Accordingly, the controller 180 may recognize a touch region of the display unit 151.

Referring to FIG. 2, the proximity sensor 141 may be provided at an inner region of the mobile terminal surrounded by the touch screen or provided closely to the touch screen. The proximity sensor 141 refers to a sensor to sense an object approaching a predetermined sensing surface or existing around the predetermined sensing surface using an electromagnetic field or an infrared ray without the mechanical contact with the object. The proximity sensor 141 has a longer lifespan and higher utilization as compared with those of a tactile sensor.

For example, the proximity sensor 141 may include a transmission type photoelectric sensor, a direct reflective photoelectric sensor, a minor reflective photoelectric sensor, a high frequency oscillation type proximity sensor, a capacitive proximity sensor, a magnetic type proximity sensor, or an infrared proximity sensor. If the touch screen is a capacitive touch screen, the touch screen may detect the proximity of a pointer as an electromagnetic field is changed according to the proximity of the pointer to the touch screen. In this case, the touch screen (touch sensor) may serve as the proximity sensor.

The sound output module 152 may receive a call signal or may output audio data received from the wireless communication unit 110 or stored in the memory 160. The sound output module 152 outputs a sound signal (e.g. call signal receiving sound, or message receiving sound) related to functions performed by the mobile terminal 100. The sound output module 152 may include a receiver, a speaker, and a buzzer.

The alarm unit 153 outputs a signal which notifies the generation of events from the mobile terminal 100. For example, the events generated from the mobile terminal 100 include call signal reception, message reception, key signal input, and touch input. The alarm unit 153 may output a signal, which notifies the generation of the event, as another type of a signal, for example vibration, in addition to the video signal or the audio signal. The video signal or the audio signal may be output even through the display unit 151 or the voice output module 152. The display unit 151 and the voice output module 152 may be classified as components of the alarm part 153.

The haptic module 154 generates various tactile effects that may be felt by a user. The representative example of the tactile effect generated frame the haptic module 154 is vibration. The intensity and the pattern of vibration generated from the haptic module 154 may be controlled. For example, mutually different vibrations may be syn-thesized or sequentially output.

The haptic module 154 creates various tactile effects, such as a pin arrangement vertically moving with respect to a contact surface of a skin, blowing force or suction force of air through a blowing port or a suction port, the touch to a skin surface, the contact with an electrode, an effect resulting from the stimulation of elastic force, and an effect resulting from the reproduction of cooling and warming feelings using a device that absorbs or emits heat, in addition to vibration.

The haptic module 154 not only can transmit the tactile effect through the direct contact, but also allows a user to feel the tactile effect through muscle senses in a finger or an arm. At least two haptic modules 154 can be provided according to the configuration of the mobile terminal 100.

The memory 160 may store a program for the operation of the controller 180 and may temporarily store input/output data (e.g., phone book, message, still image, and moving picture). The memory 160 may store data of vibration and sound having various patterns output when the touch is input onto the touch screen.

The memory 160 may include a storage medium including at least one of a flash memory type memory, a hard disk type memory, a multimedia card micro-type memory, and a card type memory (e.g., SD or XD memory), a random access memory (RAM), a static random access memory (SRAM), a read-only memory (ROM), an electrically erasable programmable read-on memory (EEPROM), a programmable read-on memory (PROM), a magnetic memory, a magnetic disc, and an optical disc. The mobile terminal 100 may be operated in association with a web storage to perform a storage function of the memory 160 on the Internet.

The interface unit 170 serves as a passage with all external appliances connected with the mobile terminal 100. The interface unit 170 transmits data from an external device, receives power to transmit the power to each component provided in the mobile terminal 100, and transmits the internal data of the mobile terminal 100 to the external device. For example, the interface unit 170 may include a wire/wireless headset port, an external charger port, a wire/wireless data port, a memory card port, a port for the connection with a device having an identification module, an audio I/O (input/output) port, a video I/O (input/output) port, and an earphone port.

The identification module serves as a chip to store various information to validate user authority of the mobile terminal 100, and may include a user identify module (UIM), a subscriber identify module (SIM), and a universal subscriber identify module (USIM). The device having the identification module (hereinafter, referred to as "identification device") may be formed in the form of a smart card. Accordingly, the identification device may be connected with the terminal 100 through a port.

The interface unit may serve as a passage through which power is supplied from an external cradle to the mobile terminal 100 when the mobile terminal 100 is connected with the external cradle, or may serve as a passage through which various instruction signals input from the cradle by the a user are transmitted to the mobile terminal 100. The various instruction signals or the power input from the cradle may serve as signals to recognize that the mobile terminal 100 is correctly mounted in the cradle.

In general, the controller 180 controls the overall operations of the mobile terminal 100. For example, the controller 180 performs relevant controlling and processing operations for voice communication, data communication, and video conference communication. The controller 180 may include a multimedia module 181 to reproduce multimedia. The multimedia module 81 may be realized inside the controller 180, or separately from the controller 180. The controller 180 controls the wireless communication unit 110 so that the wireless communication unit 110 makes communication with the indoor lighting device 200.

Preferably, the controller 180 acquires wireless Internet connection state information, connected wireless AP information, sensing information of the sensing unit 140, output screen information of the display unit 151, output voice information of the sound output module 152, information of a residual amount of battery of the power supply unit 190, and information of various data stored in the memory 160. In addition, the controller 180 acquires information of call connection or information of message reception event occurrence according to operations of the mobile communication module 112, and transmits the acquired information to the indoor lighting device 200.

The controller 180 may perform a pattern recognition process that a handwriting input and a drawing input performed on the touch screen can be recognized in the form of a text and an image, respectively.

The power supply unit 190 receives external power or internal power under the control of the controller 180 to supply power required for the operation of each component.

Various embodiments described here can be realized in a recording medium that is readable by a computer or similar devices by, for example software, hardware, or the combination thereof.

According to the embodiment described herein, the hardware may be realized using by at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for other functions. The embodiments may be partially controlled by the controller 180.

Regarding software realization, embodiments such as procedures or functions may be realized together with a different software module to perform at least one function or operation. A software code may be realized through a software application made in a desirable program language. The software code may be stored in the memory 160 and may be performed by the controller 180.

FIG. 3 is a detailed block diagram showing the indoor lighting device 200 shown in FIG. 1.

Referring to FIG. 3, the indoor lighting device 200 includes a lighting unit 210, a wireless communication unit 220, a storage unit 230, a controller 240, and an input unit 250.

The lighting unit 210 emits light. In this case, the lighting unit 210 includes a light emitting diode (LED), a fluorescent lamp, an incandescent lamp, and a halogen lamp.

The wireless communication unit 220 performs a wireless communication function together with the mobile terminal 100. The wireless communication unit 220 includes a wireless transmitter to up-convert and amplify a frequency of a transmitted signal, and a wireless receiver to low-noise amplify the received signal and to down-convert the frequency.

The storage unit 230 includes a program memory and a data memory. The program memory stores a program to control a general operation of the indoor lighting device 200. The data memory stores data generated in the process of performing programs in the indoor lighting device 200.

The storage unit 230 stores a conditional table including information of operating conditions of the emitting unit 210 corresponding to the operating states of the mobile terminal 100.

The conditional table will be described in more detail below.

The controller 240 controls the overall operation of the indoor lighting device 200.

The controller 240 allows the reception of information of the operating states of the mobile terminal 100 through the wireless communication unit 220.

In addition, the controller 240 checks the operating condition of the light emitting unit 210 corresponding to the received information using the stored conditional table.

Further, the controller 240 drives the light emitting unit 210 based on the checked operating condition if the operating condition checked.

The input unit 250 provides an interface to set and perform various functions of the indoor lighting device 200. In this case, the input unit 250 may include a switch to manually turn on or turn off the light emitting unit 210.

Hereinafter, the type of the conditional table and the operation of the controller 240 will be described in more detail.

First, the indoor lighting device 200 according to the embodiment of the present invention is installed in the previously allocated space. The operation of one specific indoor lighting device 200 among a plurality of indoor lighting devices 200 will be described below on the assumption that the specific indoor lighting device 200 is installed in a first space.

The indoor lighting device 200 is installed in the first space to receive the information of the operating state of the mobile terminal 100 is received and to perform the operation of the indoor lighting device 200 according to the received information of the operating state of the mobile terminal 100.

To this end, the controller 240 receives information of the operating state of the mobile terminal 100 through the wireless communication unit 200, and decides an operating condition of the light emitting unit 210 based on the received information of the operating state of the mobile terminal 100.

In this case, the controller 240 determines if the mobile terminal 100 is located at the first space where the controller 240 is installed. If the mobile terminal 100 is located in the first space, the controller 240 decides the operating condition of the light emitting unit 210 by reflecting the operating state of the mobile terminal 100. In addition, if the mobile terminal 100 is not located at the first space, the controller 240 does not reflect the operating state of the mobile terminal 100 in order to decide the operating condition of the light emitting unit 210.

To this end, the controller 240 determines if the mobile terminal 100 is located in the first space.

In this case, the controller 240 may receive GPS information of the mobile terminal 100 and determine the location of the mobile terminal 100. However, the GPS information may not be acquired in an indoor space normally. Accordingly, according to the present invention, the controller 240 determines the location of the mobile terminal 100 through a following scheme.

According to the first embodiment, the controller 240 determines the location of the mobile terminal 100 by making communication with the wireless AP installed in a first space.

FIG. 4 is a block diagram showing an installation example of the lighting system according to the embodiment of the present invention.

Referring to FIG. 4, an indoor space 400 is partitioned into first to ninth spaces 410, 420, 430, 440, 450, 460, 470, 480, and 490.

The indoor lighting devices 200 and the wireless APs 500 are installed in the first to ninth first to ninth spaces 410, 420, 430, 440, 450, 460, 470, 480, and 490, respectively.

In the lighting system having the above structure, the controller 240 determines the location of the mobile terminal 100 by making communication with the wireless AP 500.

In other words, the controller 240 requests information of a communication connection state from the wireless AP 500 in order to determine if the present wireless AP 500 is connected with the mobile terminal 100.

In addition, if the mobile terminal 100 is connected with the wireless AP 500, the controller 240 determines that the mobile terminal 100 is located at the space where the controller 240 is installed. In other words, the wireless AP 500 making communication with the controller 240 is a wireless AP located in the space where the controller 240 is installed.

In addition, if the mobile terminal 100 is connected with the wireless AP 500, the controller 240 determines that the present location of the mobile terminal 100 exists around the wireless AP 500, that is, at the space wherein the controller 240 is installed.

Further, according to the second embodiment of the present invention, the controller 240 checks the present location of the mobile terminal 100 by making communication with the mobile terminal 100.

To this end, the controller 240 requests the information of a wireless AP that the mobile terminal 100 currently accesses.

Then, if the information of the wireless AP that the mobile terminal 100 accesses is received according to the information request, the controller 240 determines if the wireless AP that the mobile terminal 100 currently accesses is a wireless AP located in the space where the controller 240 is installed.

Thereafter, if the wireless AP that the mobile terminal 100 current accesses is the wireless AP located at the space where the controller 240 is installed, the controller 240 determines that the mobile terminal 100 exists at the first space. Otherwise, the controller 240 determines that the mobile terminal deviates from the first space.

Meanwhile, even if the mobile terminal 100 exists in the first space, the mobile terminal 100 may not be connected with the wireless AP existing in the first space. Accordingly, the controller 240 requests information about whether or not the mobile terminal 100 can be connected with the wireless AP existing in the first space, that is, whether or not the mobile terminal 100 can access the wireless AP to make wireless communication with the wireless AP, and the controller 240 may detect the location of the mobile terminal 100 based on the information.

The indoor lighting device 200 according to the embodiment of the present invention can exactly detect the location of the mobile terminal 100 through the above scheme.

If the controller 240 determines that the mobile terminal 100 is located in the first space, the controller 240 requests the operating state of the mobile terminal 100. The controller 240 decides the operating condition of the light emitting unit 210 based on the requested operating state.

In this case, if the controller 240 determines that the mobile terminal 100 is located at the first space, the controller 240 powers on the light emitting unit 210 once.

In this case, the controller 240 does not power on the light emitting unit 210 simply, but may decide light emitting conditions of the light emitting unit 210, and operates the light emitting unit 210 by applying the decided light emitting conditions.

FIG. 5 is a view showing the first conditional table according to the embodiment of the present invention.

The first conditional table has operating conditions of the light emitting unit 210 according to signal intensities.

In other words, the storage unit 230 stores the first conditional table including information of signal intensities according to communication connection states between the mobile terminal 100 and the wireless AP and the operating conditions of the light emitting unit corresponding to the information of the signal intensities.

In this case, the operating conditions may include at least one of a power-on condition, a brightness level condition, a color temperature condition, an emitted light color condition, and an on/off period condition. In this case, the light emitting unit 210 may include a plurality of light emitting units. Each of the light emitting units may include a blue light emitting unit, a green light emitting unit, and a red light emitting unit. The emitted light color condition is a condition to determine a light emitting unit to be powered on among the blue, green, and red light emitting units.

Hereinafter, although the operating conditions include a plurality of conditions described above, only the brightness level will be described for the convenience of explanation.

In other words, the controller 240 checks the information of a signal intensity according to the access states if the mobile terminal 100 in the connection state with the wireless AP.

Then, the controller 240 extracts the operating condition of the light emitting unit 210 corresponding to the checked signal intensity from the storage unit 230, and controls the operation of the light emitting unit 210 corresponding to the checked operating condition.

For example, if a superior communication connection state is mad between the mobile terminal 100 and the wireless AP, and the best signal intensity (a signal intensity positioned at the uppermost part of the conditional table) is represented, the controller 240 supplies operating power to the light emitting unit 210 while controlling the light emitting unit 210 to emit light with 100% of brightness.

Therefore, the information of the operating state of the mobile terminal 100 is the information of the operating state of the wireless communication unit provided in the mobile terminal 100.

FIG. 6 is a view showing a second conditional table according to the embodiment of the present invention.

The second conditional table includes operating conditions of the light emitting unit 210 according to images.

In other words, the storage unit 230 stores the second conditional table including the type of an image reproduced by the mobile terminal 100 and the operating conditions of the light emitting unit 210 corresponding to the type of the image.

In this case, the operating conditions include a power condition and a brightness level condition of the light emitting unit 210.

In other words, if the mobile terminal 100 is in the connection state with the wireless AP, the controller 240 determines the type of the image that is currently represented by the mobile terminal 100. In other words, the controller 240 requests information of an output screen image of the mobile terminal 100, and receives the information corresponding to the information of the output screen image.

In addition, the control unit 240 extracts the operating condition of the light emitting unit 210 corresponding to the determined information (the type of an image) of the output screen image from the storage unit 230, and controls the operation of the light emitting unit 210 corresponding to the extracted operating condition.

For example, if a first moving picture is output from the mobile terminal 100, the controller 240 supplies the operating power to the light emitting unit 210 while controlling the light emitting unit 210 to emit light with 100% brightness.

In this case, the distinguishment may be made among the first to third moving pictures according to motion variation of each frame of an image output through the display unit of the mobile terminal 100.

In addition, the distinguishment may be made between first and second still images by an average brightness level of each frame of the image output through the display unit.

Therefore, the information of the operating state of the mobile terminal 100 includes the information of the operating state of the display unit.

FIG. 7 is a view showing a third conditional table according to the embodiment of the present invention.

The third conditional table includes operating conditions of the light emitting unit 210 according to illuminance.

In other words, the storage unit 230 stores the conditional table including the level of the illuminance made around the mobile terminal 100 and the operating condition of the light emitting unit 210 corresponding to the level of the illuminance.

In this case, the operating conditions include a power condition and a brightness level condition of the light emitting unit 210.

In other words, the controller 240 measures the level of the illuminance formed at the first space where the mobile terminal 100 is located, if the mobile terminal 100 in the connection state with the wireless AP.

Then, the controller 240 receives information corresponding to the level of the illuminance if the level of the illuminance is received.

In addition the controller 240 extracts the operating condition of the light emitting unit 210 corresponding to the level of the illuminance from the storage unit 230, and controls the operation of the light emitting unit 210 corresponding to the extracted operating condition.

For example, if the level of the surrounding illuminance of the mobile terminal 100 is a first level, the controller 240 supplies operating power to the light emitting unit 210 while controlling the light emitting unit 210 to emit light with 100% of brightness.

Therefore, the information of the operating state of the mobile terminal 100 includes the information of the operating state of a sensing unit (preferably, illuminance sensor).

FIG. 8 is a view showing the fourth conditional table according to the embodiment of the present invention.

The fourth conditional table includes an operating condition of the light emitting unit 210 according to an output state of the image displayed on the mobile terminal 100.

In this case, image conditions may include a brightness level of an image, the motion variation of an object contained in the image, and brightness variation. Hereinafter, an example that the image condition is the brightness level of the image.

The fourth conditional table includes operating conditions of the light emitting unit 210 according to the brightness level of a display screen image of the mobile terminal 100.

In other words, the storage unit 230 stores the fourth conditional table including the brightness level of the display screen image of the mobile terminal 100 and the operating conditions of the light emitting unit 210 corresponding to the brightness level of the display screen image of the mobile terminal 100.

In this case, the operating conditions include a power condition and a brightness level condition of the light emitting unit 210.

In other words, the controller 240 requests the brightness level of the display unit of the mobile terminal 100 if the mobile terminal 100 is in the connection state with the wireless AP.

Then, the controller 240 extracts the operating condition of the light emitting unit 210 corresponding to the brightness level from the storage unit 230 if the information of the requested brightness level is received, and controls the operation of the light emitting unit 210 corresponding to the extracted operating condition.

For example, if the brightness level of the display screen image of the mobile terminal 100 is a fifth level, the controller 240 supplies operating power to the light emitting unit 210 while controlling the light emitting unit 210 to emit light with 100% of brightness.

Therefore, the information of the operating state of the mobile terminal 100 includes the information of the operating state of the display unit.

FIG. 9 is a view showing a fifth conditional table according to the embodiment of the present invention.

The fifth conditional table includes operating conditions of the light emitting unit 210 according to the output state of voice which is output through a speaker of the mobile terminal 100.

The output states of the voice may include a volume level, the frequency of the voice, and variation of the volume level. Hereinafter, an example that the output state of the voice is the volume level will be described.

The fifth conditional stable includes operating conditions of the light emitting unit 210 according to the volume level.

In other words, the storage unit 230 stores the fifth conditional table including the volume level of the voice output from the mobile terminal 100 and the operating conditions of the light emitting unit 210 corresponding to the volume level of the voice.

In this case, the operating conditions include a power condition and a brightness level condition of the light emitting unit 210.

In other words, the controller 240 requests the information of the volume level of the voice, which is current output from the mobile terminal 100, if the mobile terminal 100 in the connection state with the wireless AP.

Then, the controller 240 extracts the operating condition of the light emitting unit 210 corresponding to the volume level from the storage unit 230 if the information of the volume level is received, and controls the operation of the light emitting unit 210 corresponding to the extracted operating condition.

For example, if the volume level of the mobile terminal 100 is a fifth level, the controller 240 supplies operating power to the light emitting unit 210 while controlling the light emitting unit 210 to emit light with 100% of brightness.

Therefore, the information of the operating state of the mobile terminal 100 includes the information of the operating state of the sound output module.

FIG. 10 is a view showing a sixth conditional table according to the embodiment of the present invention.

The sixth condition table includes operating conditions of the light emitting unit 210 according to download progress states.

In other words, the storage unit 230 stores the sixth conditional table including information of a progress state related to a download operation performed into the mobile terminal 100 and the operating conditions of the light emitting unit 210 corresponding to the information of the progress state.

In this case, the operating conditions include a power condition and a brightness level condition of the light emitting unit 210.

In other words, the controller 240 checks whether or not present contents are downloaded in the mobile terminal 100 if the mobile terminal 100 in the connection state with the wireless AP.

If content download is in progress, the controller 240 requests information of a progress state of the content download that is currently performed, and extracts the operating condition of the light emitting unit 210 corresponding to the progress state of the content download from the storage unit 230, and controls the operation of the light emitting unit 210 corresponding to the extracted operating condition.

For example, if the state of the content download in progress inside the mobile terminal 100 is 0%, the controller 240 supplies operating power to the light emitting unit 210 while controlling the light emitting unit 210 to emit light with 100% of brightness.

Therefore, the information of the operating state of the mobile terminal 100 includes the information of the operating state of the wireless communication unit.

FIG. 11 is a view showing a seventh conditional table according to the embodiment of the present invention.

The fifth conditional table includes operating conditions of the light emitting unit 210 according to a residual state of a battery.

In other words, the storage unit 230 stores the seventh conditional table including a residual amount of the battery of the mobile terminal and the operating conditions of the light emitting unit 210 corresponding to information of the residual amount of the battery.

In this case, the operating conditions include a power condition and a brightness level condition of the light emitting unit 210.

If the mobile terminal 100 in the connection state with the wireless AP, the controller 240 requests information of a residual amount of the battery provided in the mobile terminal 100.

Then, the controller 240 extracts the operating condition of the light emitting unit 210 corresponding to the received information of the residual amount of the battery. If the information of the residual amount of the battery is received, and controls the operation of the light emitting unit 210 corresponding to the extracted operating condition.

For example, if the residual amount of the battery of the mobile terminal 100 is 100%, the controller 240 supplies operating power to the light emitting unit 210 while controlling the light emitting unit 210 to emit light with 100% of brightness.

Therefore, the information of the operating state of the mobile terminal 100 includes the information of the operating state of the power supply unit.

The indoor lighting device 200 may decide the operating condition of the light emitting part 210 according to running applications executed by the mobile terminal 100.

For example, the indoor lighting device 200 may operate the light emitting unit 210 if alarm time comes as an alarm application of the mobile terminal 100 is executed.

If the indoor lighting device 200 may decide the operating condition of the light emitting unit according to weather information at present time if a weather application of the mobile terminal 100 is in a running state. To this end, the storage unit 230 of the indoor lighting device 200 may additionally store the information of weather and the information of the operating condition of the light emitting unit 210 corresponding to the weather.

In addition, if the mobile terminal 100 tries call connection or an event that a text message is received occurs, the indoor lighting device 200 may operate the light emitting unit 210 at a time point at which the event occurs.

Further, the indoor lighting device 200 may operate the light emitting unit 210 according to the states of a user using the mobile terminal 100. The states of the user are acquired by one of a plurality of sensors provided in the mobile terminal 100.

In other words, the mobile terminal 100 includes the proximity sensor and the camera, and the proximity sensor and the camera provided in the mobile terminal 100 acquire the information of the user using the mobile terminal 100 and transmit the acquired user information to the indoor lighting device 200.

In addition, the indoor lighting device 200 may operate the light emitting unit 210 according to the user information received therein.

Meanwhile, the user state may include a use state of the mobile terminal 100 by the user. Alternately, the user state may include a preset sleep state of the user.

According to the embodiment of the present invention, indoor lighting can be realized based on sense states of various sensors, such as an illuminance sensor, a proximity sensor, and a camera, provided in the mobile terminal, so that the number of components provided in the indoor lighting device. Accordingly, the component cost can be reduced, and the volume of the indoor lighting device can be reduced.

In addition, according to the embodiment of the present invention, the indoor lighting device is operated according to the operating states of the mobile terminal in use by the user, thereby providing the lighting environment appropriate to the demand of the user or the living environment of the user and actively and ideally operated according to occasions.

FIGS. 12 to 19 are flowcharts to explain a method of operating the indoor lighting device 200 according to the embodiment of the present invention step by step.

Figure 12:
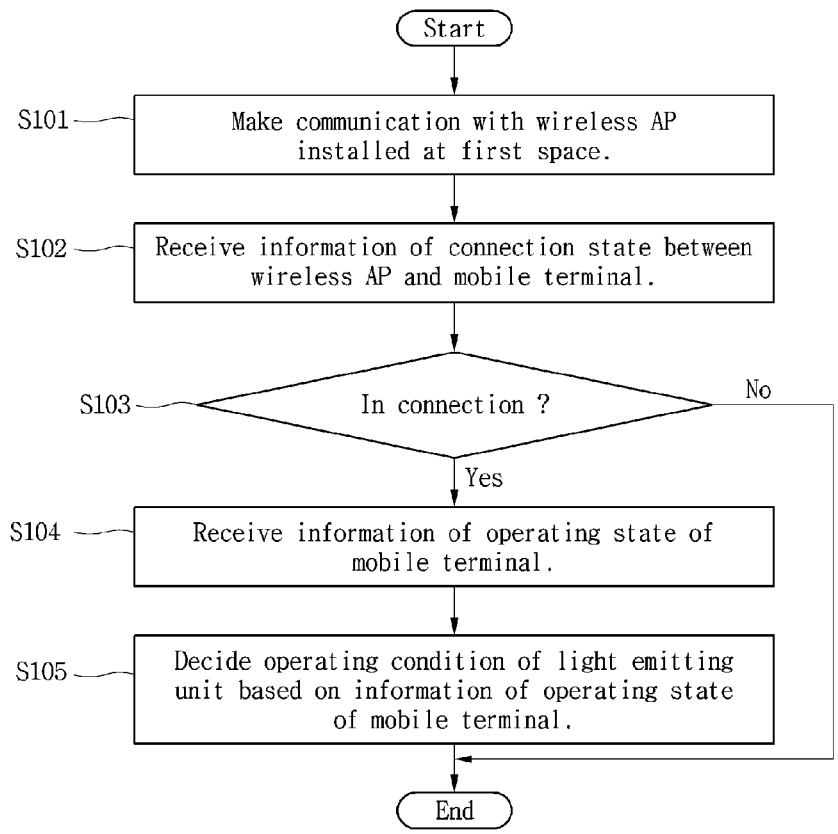
FIGS. 12 to 19 are flowcharts to explain a method of operating the indoor lighting device 200 according to the embodiment of the present invention.

Referring to FIG. 12, the indoor lighting device 200 makes communication with a wireless AP installed at the first space the indoor lighting device 200 is located (step S101).

If the communication with the wireless AP is made, the indoor lighting device 200 receives information of a connection state between the wireless AP and the mobile terminal 100 from the wireless AP (step S102).

Thereafter, the indoor lighting device 200 determines if the wireless AP is currently in the connection with the mobile terminal 100 (step S103).

If the wireless AP is currently in the connection with the mobile terminal 100 according to the determination result (step S103), the indoor lighting device 200 receives the information of the operating state of the mobile terminal 100 (step S104).

Thereafter, the indoor lighting device 200 decides an operating condition of the light emitting unit 210 based on the information of the operating state of the mobile terminal 100 (step 5105)

Figure 13:
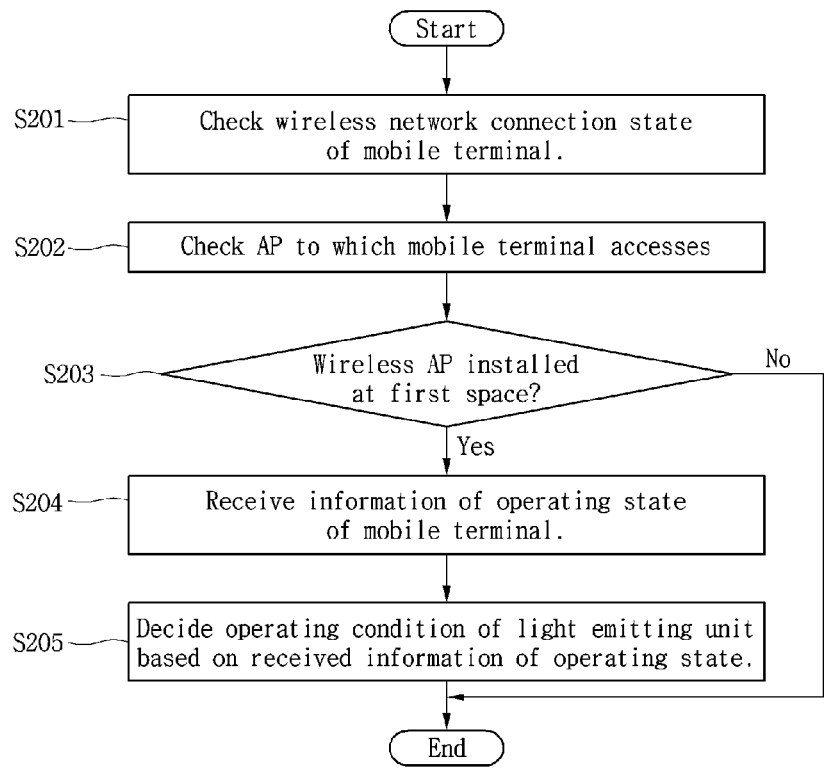

Next, referring to FIG. 13, the indoor lighting device 200 checks a wireless network connection state of the mobile terminal 100 (step S201).

In addition, the indoor lighting device 200 requests information of the wireless AP that the mobile terminal 100 accesses, according to the wireless network connection state of the mobile terminal 100.

Thereafter, if the information according to the request is received, the indoor lighting device 200 determines if the mobile terminal 100 is in the connection with the wireless AP installed at the first space where the mobile terminal 100 is located, based on the received information (step S203).

Then, according to the determination result (step S203), if the mobile terminal 100 is in the connection with wireless AP located at the first space, the indoor lighting device 200 receives the information of the operating state of the mobile terminal 100 (step S204).

Thereafter, the indoor lighting device 200 decides the operating condition of the light emitting unit 210 based on the information of the operating state of the mobile terminal 100 (step S205).

Figure 14:
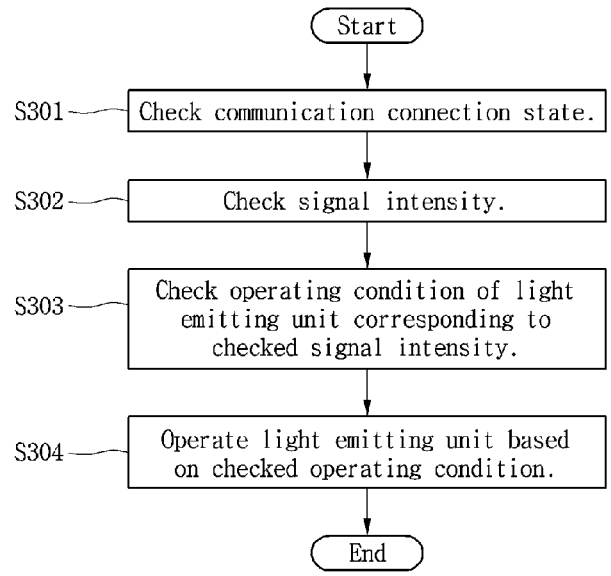

Then, referring to FIG. 14, if the mobile terminal 100 is in the connection with the wireless AP, the indoor lighting device 200 checks a communication connection state between the mobile terminal 100 and the wireless AP (step S301).

Then, the indoor lighting device 200 checks the intensity of a communication signal between the mobile terminal 100 and the wireless AP according to the checked connection state (step S302).

If the signal intensity is checked, the indoor lighting device 200 checks the operating condition of the light emitting unit 210 corresponding to the checked signal intensity (step S303).

Thereafter, the indoor lighting device 200 operates the light emitting unit 210 based on the checked operating condition of the light emitting unit 210 (step S304).

Figure 15:
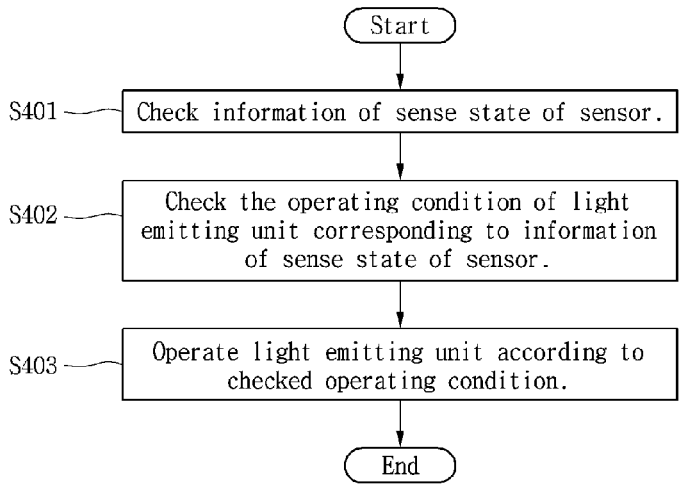

Next, referring to FIG. 15, the indoor lighting device 200 receives information of a sense state of one of a plurality of sensors provided in the mobile terminal 100 (step S401).

The sensor may include at least one of a proximity sensor, an illuminance sensor, and a camera.

Thereafter, the indoor lighting device 200 checks the operating condition of the light emitting unit 210 corresponding to the information of the sense state of the sensor (step S402).

In addition, the indoor lighting device 200 operates the light emitting unit 210 according to the checked operating condition (step S403).

Figure 16:
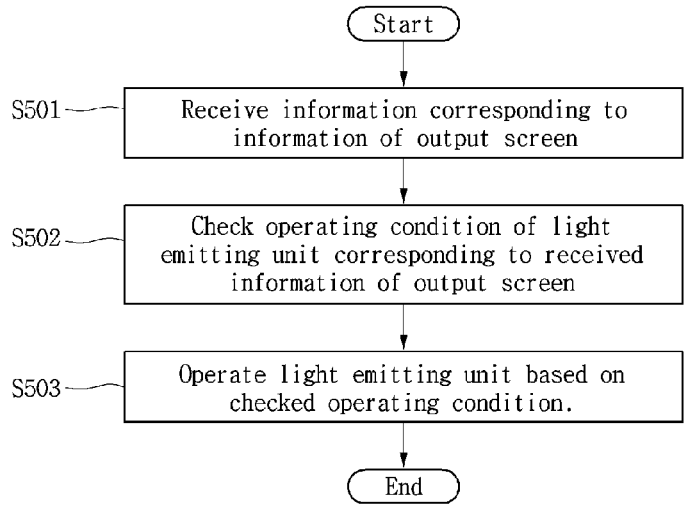

Thereafter, referring to FIG. 16, the indoor lighting device 200 receives information corresponding to the information of an output screen of an image output on the mobile terminal 100 (step S501).

Thereafter, the indoor lighting device 200 checks the operating condition of the light emitting unit 210 corresponding to the received information of the output screen (step S502).

If the operating condition is checked, the indoor lighting device 200 operates the light emitting unit 210 based on the checked operating condition (step S503).

Figure 17:
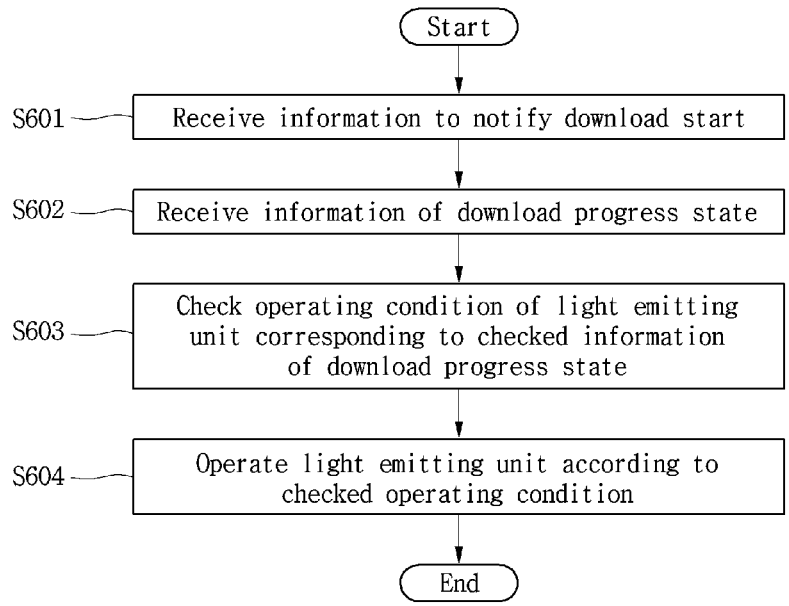

Then, referring to FIG. 17, the indoor lighting device 200 receives information to notify that content download is in progress by the mobile terminal 100 (step S601).

If an event of content download occurs from the mobile terminal 100, the indoor lighting device 200 requests information of a content download progress state according to the occurrence of the event, and receives the information of the content download progress state (step S602).

If the information of the download progress state is received, the indoor lighting device 200 checks the operating condition of the light emitting unit 210, based on the received information of the download progress state (step S603).

Thereafter, the indoor lighting device 200 operates the light emitting unit 210, based on the checked operating condition.

Figure 18:
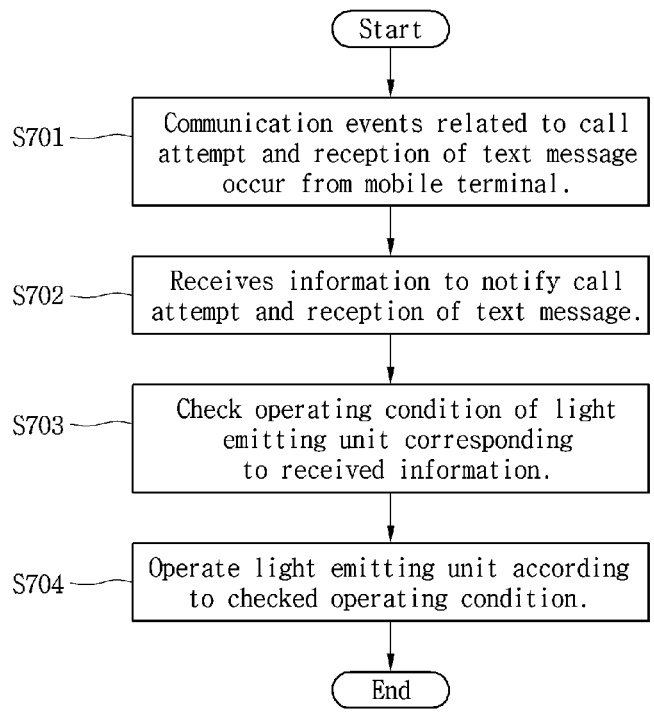

Subsequently, referring to FIG. 18, if communication events related to call attempt and the reception of a text message occur, the mobile terminal 100 transmits the information of the events to the indoor lighting device 200 (step S701).

The indoor lighting device 200 receives information to notify that the communication event occurs from the mobile terminal 100 (step S702).

The indoor lighting device 200 checks an operating condition of the light emitting unit 210 corresponding to the information to notify the occurrence of the received communication events (step S703).

Thereafter, the indoor lighting device 200 operates the light emitting unit 210 according to the checked operating condition (step S704).

Figure 19:
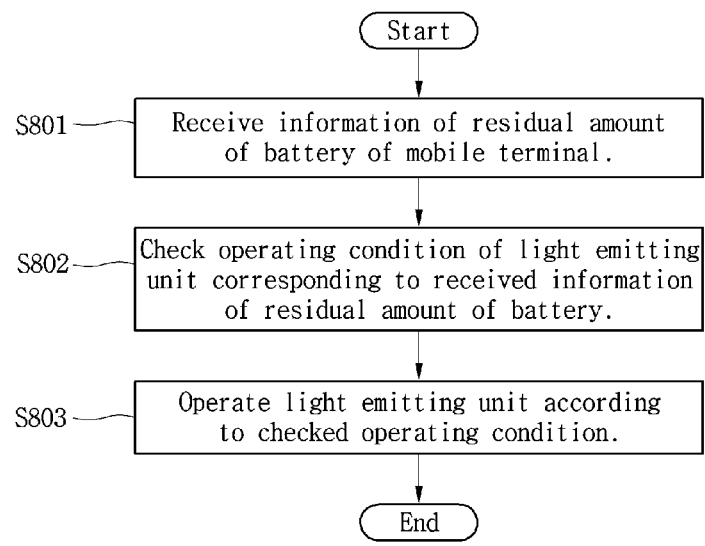

Then, referring to FIG. 19, the indoor lighting device 200 receives information of a residual amount of a battery provided in the mobile terminal 100 (step S801).

Thereafter, the indoor lighting device 200 checks the operating condition of the light emitting unit 210 corresponding to the received information of the residual amount of the battery (step S802).

Then, the indoor lighting device 200 operates the light emitting unit 210 according to the checked operating condition (step S803).

According to the embodiment of the present invention, indoor lighting can be realized based on sense states of various sensors, such as an illuminance sensor, a proximity sensor, and a camera, embedded in the mobile terminal, so that the number of components provided in the indoor lighting device. Accordingly, the component cost can be reduced, and the volume of the indoor lighting device can be reduced.

In addition, according to the embodiment of the present invention, the indoor lighting device is operated according to the operating states of the mobile terminal in use by the user, thereby providing the lighting environment appropriate to the demand of the user or the living environment of the user and actively and ideally operated according to occasions.

The invention claimed is:

1. An indoor lighting device installed at a first space, the indoor lighting device comprising:
   a light emitting unit of the indoor lighting device;
   a storage unit to store information of an operating condition of the light emitting unit according to an operating state of a mobile terminal;
   a wireless communication unit to make wireless communication with the mobile terminal; and
   a controller that receives the information of the operating state of the mobile terminal through the wireless communication unit to check the operating condition of the light emitting unit corresponding to the received information of the operating state and to operate the light emitting unit based on the checked operating condition of the light emitting unit,
   wherein the operating state of the mobile terminal comprises a charge state of a battery provided in the mobile terminal, and the controller decides the operating condition of the light emitting unit based on information of a residual amount of the battery provided in the mobile terminal.

2. The indoor lighting device of claim 1, wherein the controller determines if the mobile terminal is located at the first space where the indoor lighting device is installed, and decides the operating condition of the light emitting unit according to the information of the operating state if the mobile terminal is located at the first space.

3. The indoor lighting device of claim 2, wherein the controller receives information of a communication connection state between the mobile terminal and a wireless AP installed at the first space from the wireless AP, and determines a location of the mobile terminal based on the received information of the communication connection state.

4. The indoor lighting device of claim 2, wherein the controller receives information of a wireless AP that the mobile terminal currently accesses, and determines a location of the mobile terminal by checking whether the wireless AP corresponding to the received information is installed at the first space.

5. The indoor lighting device of claim 1, wherein the operating state of the mobile terminal further comprises a wireless communication state of the mobile terminal, and the controller decides the operating condition of the light emitting unit based on a signal intensity according to the wireless communication state of the mobile terminal.

6. The indoor lighting device of claim 1, wherein the operating state of the mobile terminal further comprises information detected based on one of a proximity sensor, an illuminance sensor and an image photographed by a camera, which are provided in the mobile terminal,
   the controller decides the operating condition of the light emitting unit according to the detected information, and
   the detected information comprises at least one of surrounding illuminance of the first space where the mobile terminal is located and a state of a user using the mobile terminal.

7. The indoor lighting device of claim 1, wherein the operating state of the mobile terminal further comprises information of a download state created in the mobile terminal, and the controller decides the operating condition of the light emitting unit according to a download progress state in the mobile terminal.

8. The indoor lighting device of claim 1, wherein the operating state of the mobile terminal further comprises information of an output image state of the mobile terminal, the controller decides the operating condition of the light emitting unit according to the output image state, and the output image state comprises at least one of a type of an image being output from the mobile terminal, a motion variation in the image, an average brightness level of the image, and a variation in the average brightness level.

9. The indoor lighting device of clam 1, wherein the operating state of the mobile terminal further comprises information of a state of voice output from the mobile terminal, and the state of the output voice comprises at least one of a volume level of the voice being output from the mobile terminal, a frequency of the voice, and a volume level variation of the voice.

10. The indoor lighting device of claim 1, wherein the operating condition of the light emitting unit comprises at least one of a power condition, a brightness level condition, an emitted light color condition, and an on/off period condition.

11. A lighting system comprising:
    a mobile terminal; and
    a plurality of indoor lighting devices installed at a space divided into a plurality of regions, respectively,
    wherein each indoor lighting device comprises:
    a light emitting unit of the indoor lighting device;
    a storage unit to store information of an operating condition of the light emitting unit according to an operating state of the mobile terminal;
    a wireless communication unit to make wireless communication with the mobile terminal; and
    a controller that determines if the mobile terminal is located at a first space where the controller is installed, and decides an operating condition of the light emitting unit according to information stored in the storage unit if the mobile terminal is located at the first space, and
    wherein the operating state of the mobile terminal comprises a charge state of a battery provided in the mobile terminal, and the controller decides the operating condition of the light emitting unit based on information of a residual amount of the battery provided in the mobile terminal.

12. The lighting system of claim 11, wherein each indoor lighting device receives information of a communication connection state between a wireless AP, which is installed at the first space where the indoor lighting device is located, and the mobile terminal from the wireless AP, and determines if the mobile terminal is located at the first space based on the received information of the communication connection state.

13. The lighting system of claim 11, wherein each indoor lighting device receives information of a wireless AP that the mobile terminal currently accesses, and determines a location of the mobile terminal by checking whether the wireless AP corresponding to the received information is installed at the first space.

14. The lighting system of claim 11, wherein the operating state of the mobile terminal further comprises at least one of a signal intensity according to a wireless communication state of the mobile terminal, a surrounding state or a user state sensed by a sensor provided in the mobile terminal, a download progress state of contents in the mobile terminal, an output image state of the mobile terminal, and an output voice state of the mobile terminal.

15. The lighting system of claim 11, wherein the operating condition of the light emitting unit comprises at least one of a power condition, a brightness level condition, an emitted light color condition and an on/off period condition.

16. A method of operating an indoor lighting device installed at a first space, the method comprising:
   determining if a mobile terminal is located at the first space where the indoor lighting device is installed;
   receiving information of an operating state of the mobile terminal if the mobile terminal is determined as being located at the first space; and
   deciding an operating condition of a light emitting unit of the indoor lighting device based on the received information of the operating state,
   wherein the operating state of the mobile terminal comprises a charge state of a battery provided in the mobile terminal, and
   wherein the controller decides the operating condition of the light emitting unit based on information of a residual amount of the battery provided in the mobile terminal.

17. The method of claim 16, wherein the determining if the mobile terminal is located at the first space comprises:
   receiving information of a communication connection state between a wireless AP, which is installed at the first space, and the mobile terminal from the wireless AP;
   determining if the mobile terminal is currently connected with the wireless AP installed at the first space based on the received information of the communication connection state; and
   determining that the mobile terminal is located at the first space if the mobile communication terminal is determined as being connected with the wireless AP.

18. The method of claim 16, wherein the determining if the mobile terminal is located at the first space comprises:
   receiving information of a wireless AP that the mobile terminal currently accesses;
   determining if the wireless AP corresponding to the received information is installed at the first space; and
   determining the mobile terminal as being located at the first space if the wireless AP corresponding to the received information is installed at the first space.

19. The method of claim 16, wherein the operating state of the mobile terminal further comprises at least one of a signal intensity according to a wireless communication state of the mobile terminal, a surrounding state or a user state sensed by a sensor provided in the mobile terminal, a download progress state of contents in the mobile terminal, an output image state of the mobile terminal, and an output voice state of the mobile terminal, and
   wherein the operating condition of the light emitting unit comprises at least one of a power condition, a brightness level condition, an emitted light color condition and an on/off period condition.

* * * * *